Dec. 4, 1928.
M. JAEGER
1,693,843
GLASS BLOWING MACHINE
Original Filed April 17, 1922    15 Sheets-Sheet 3
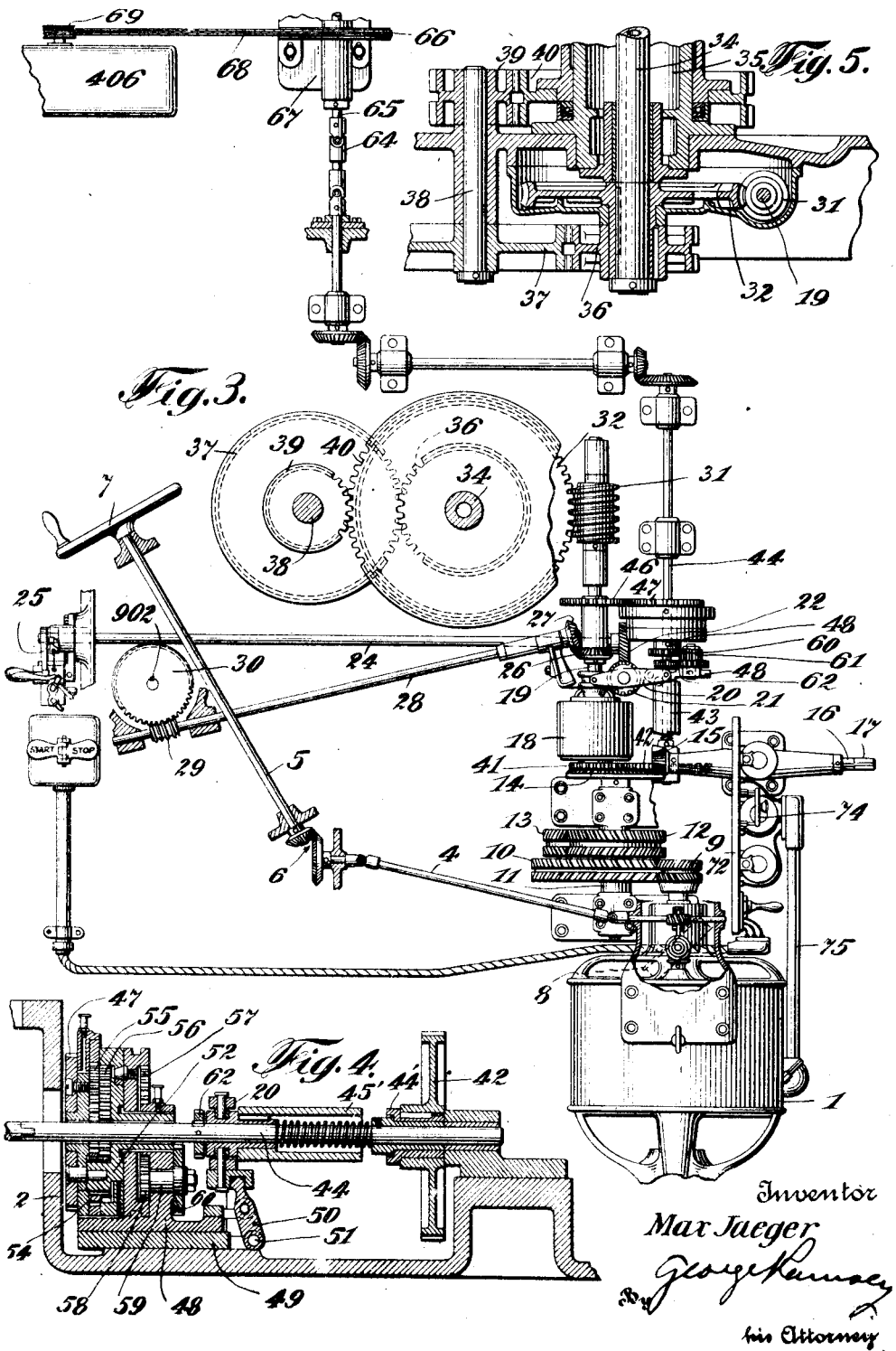
Inventor
Max Jaeger
George Kennedy
his Attorney

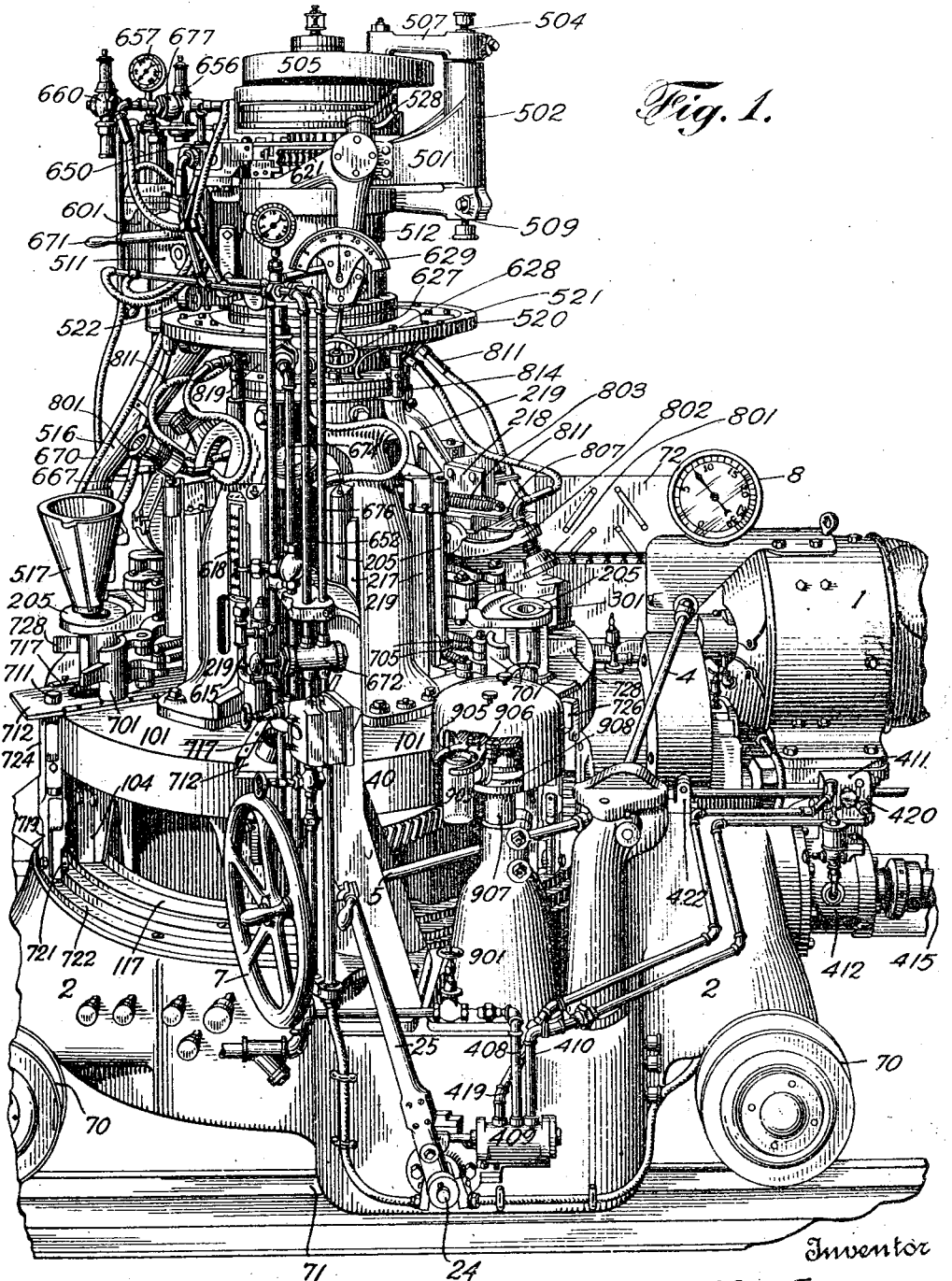

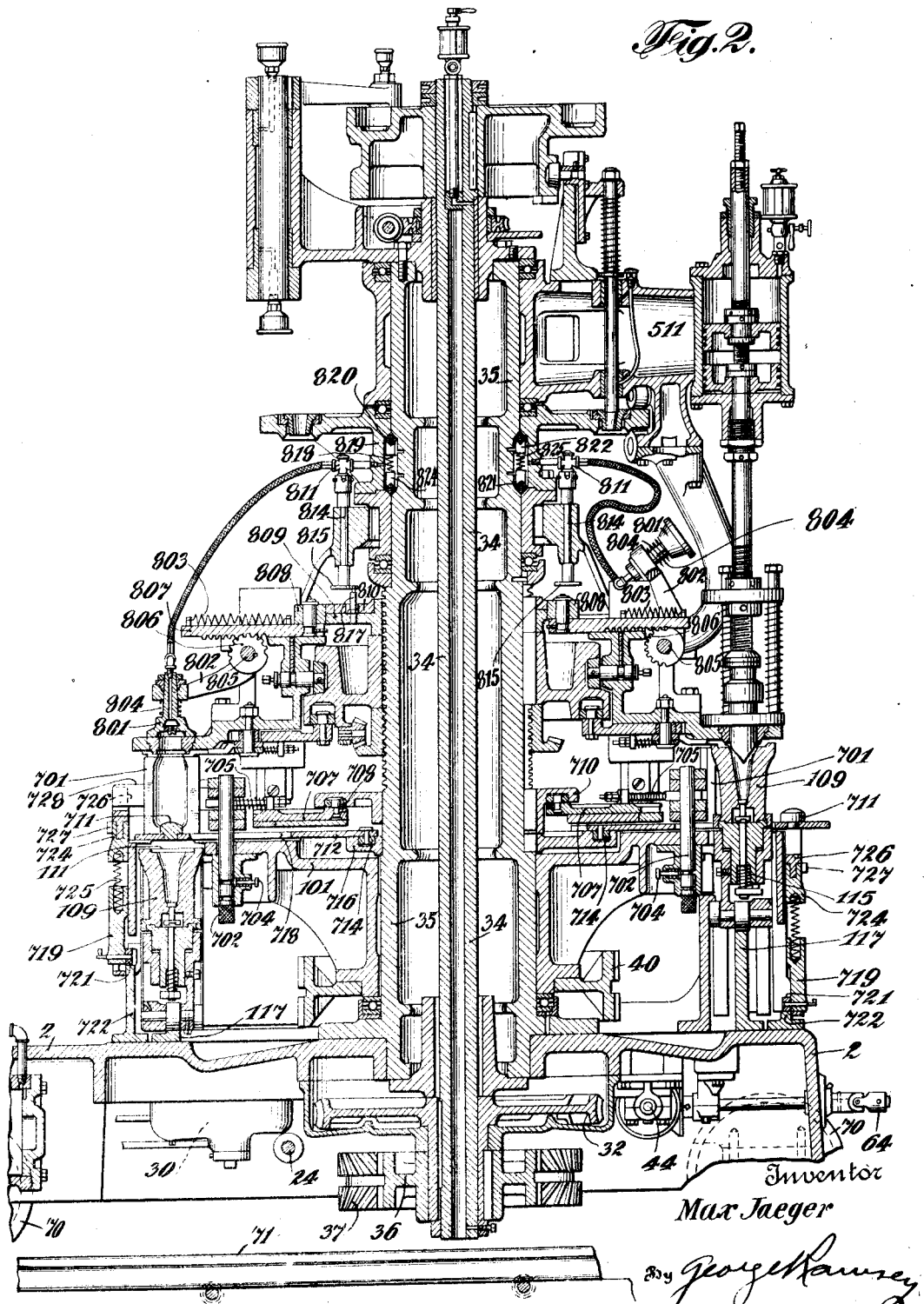

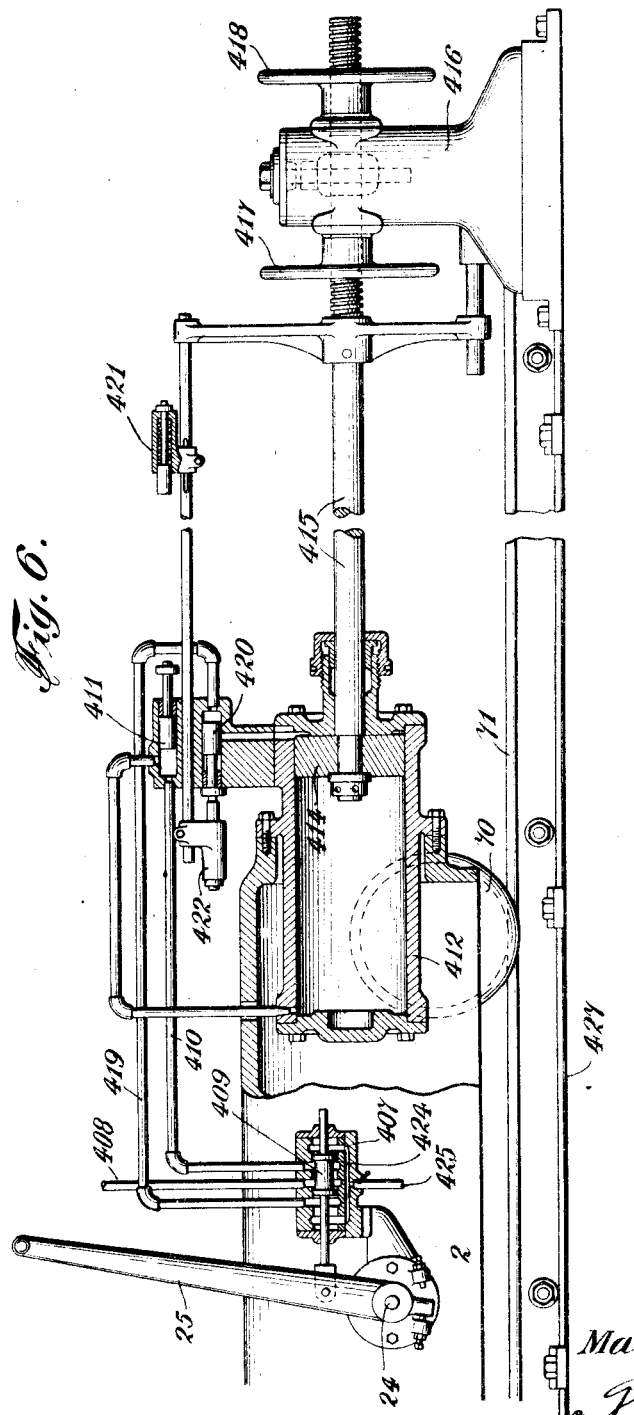

Dec. 4, 1928.  1,693,843
M. JAEGER
GLASS BLOWING MACHINE
Original Filed April 17, 1922    15 Sheets-Sheet 5
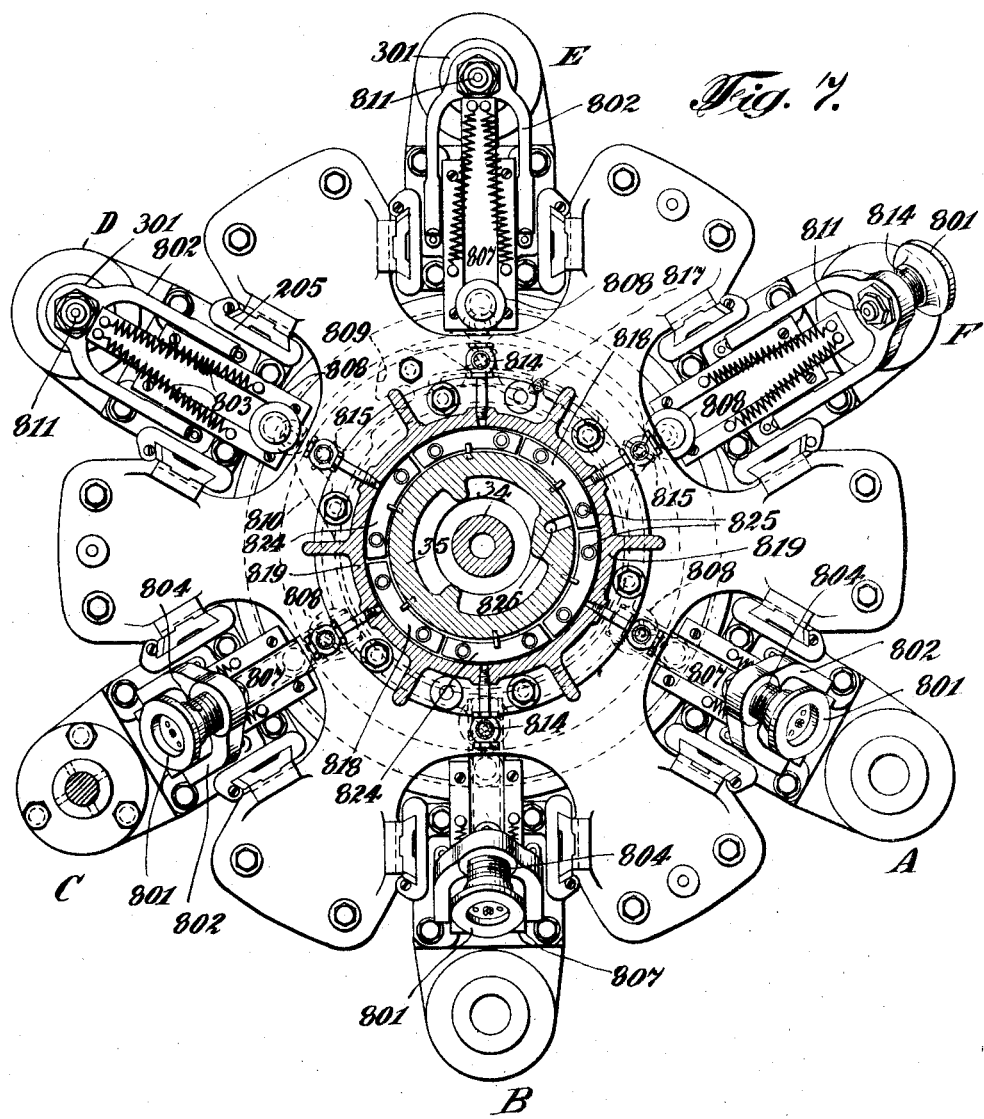
Inventor
Max Jaeger
By George Ramsey
his Attorney

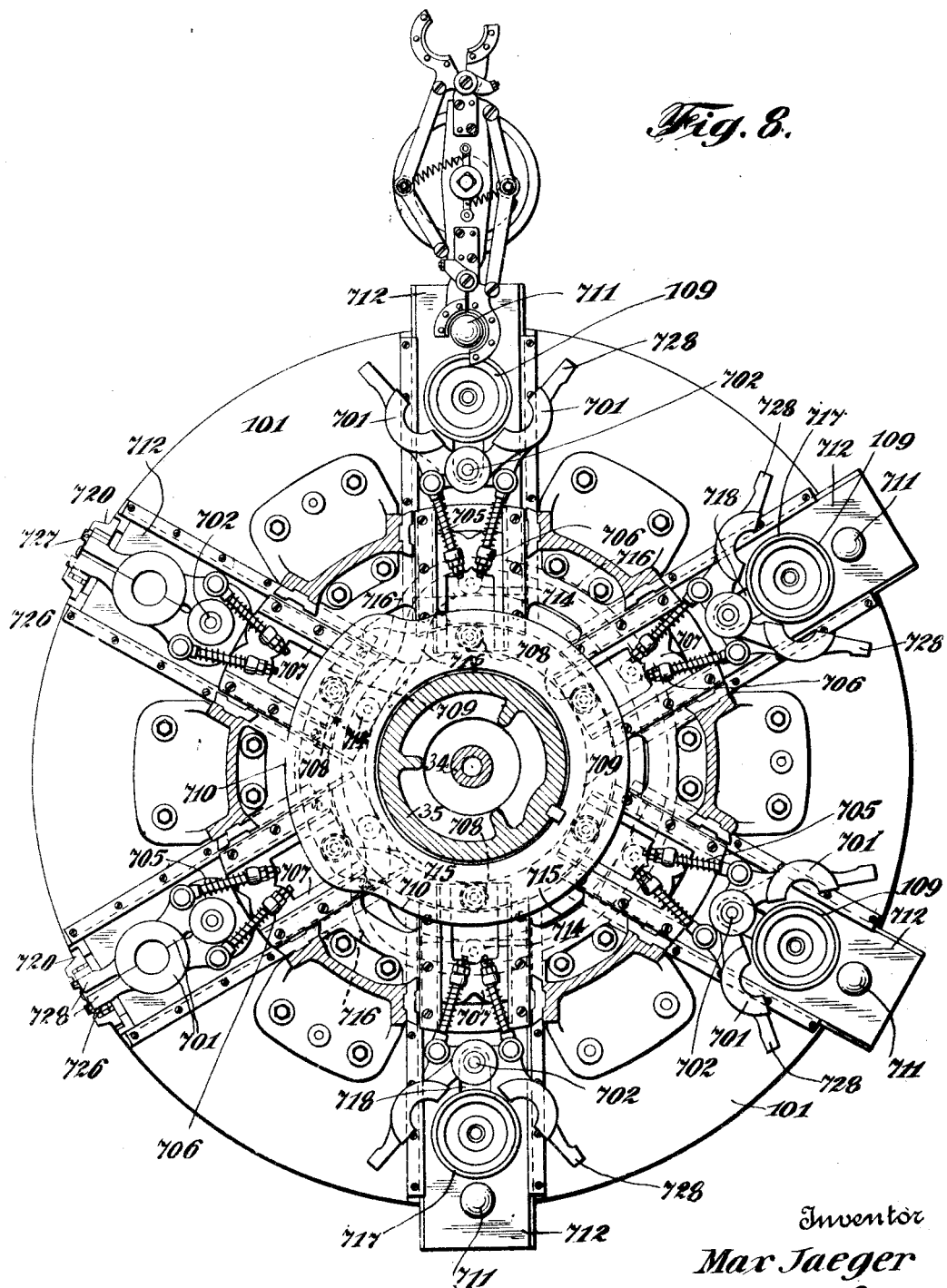

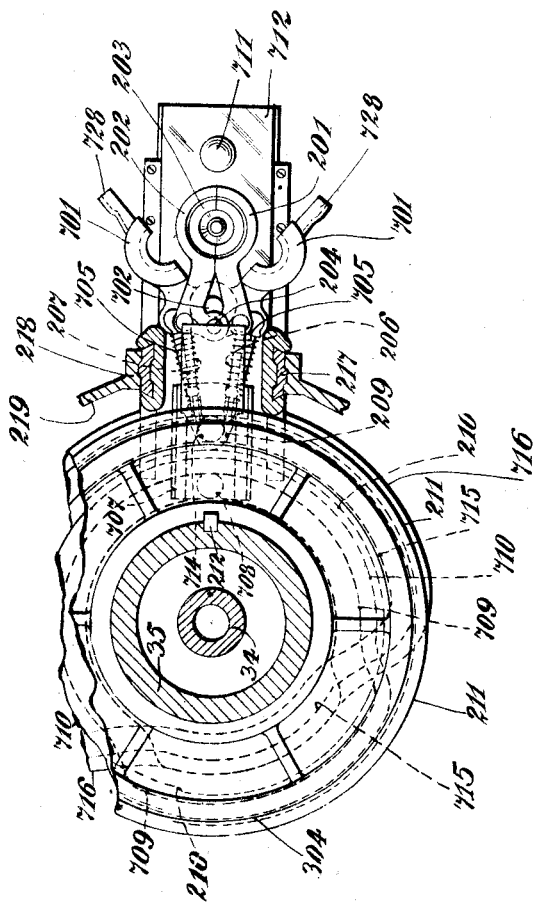

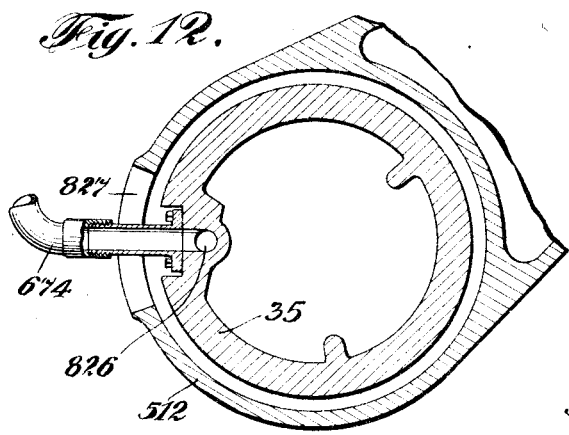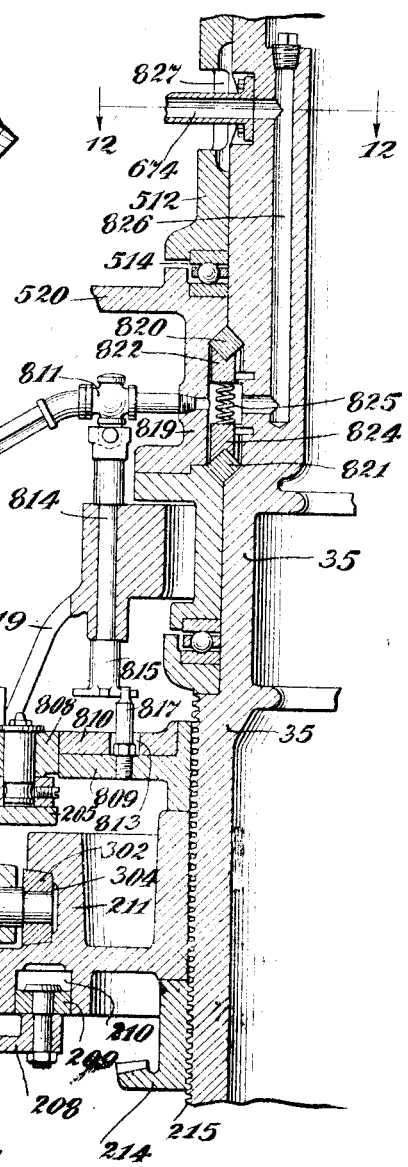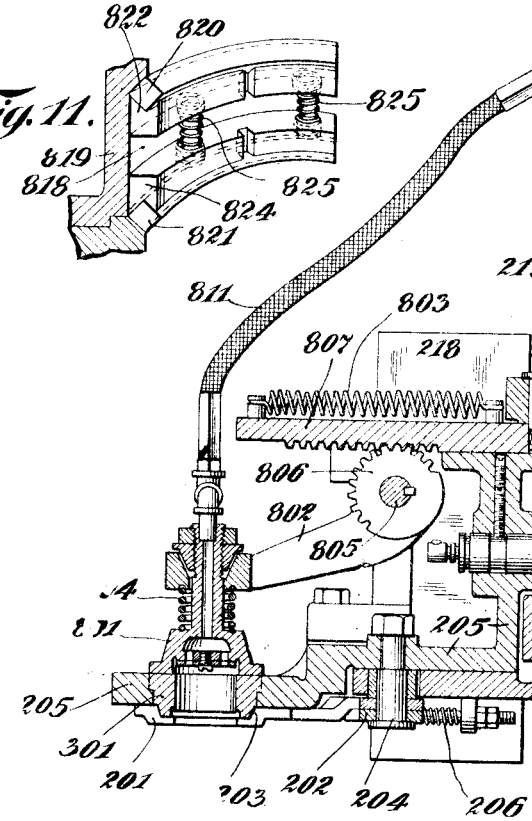

Dec. 4, 1928.
M. JAEGER
1,693,843
GLASS BLOWING MACHINE
Original Filed April 17, 1922    15 Sheets-Sheet 9
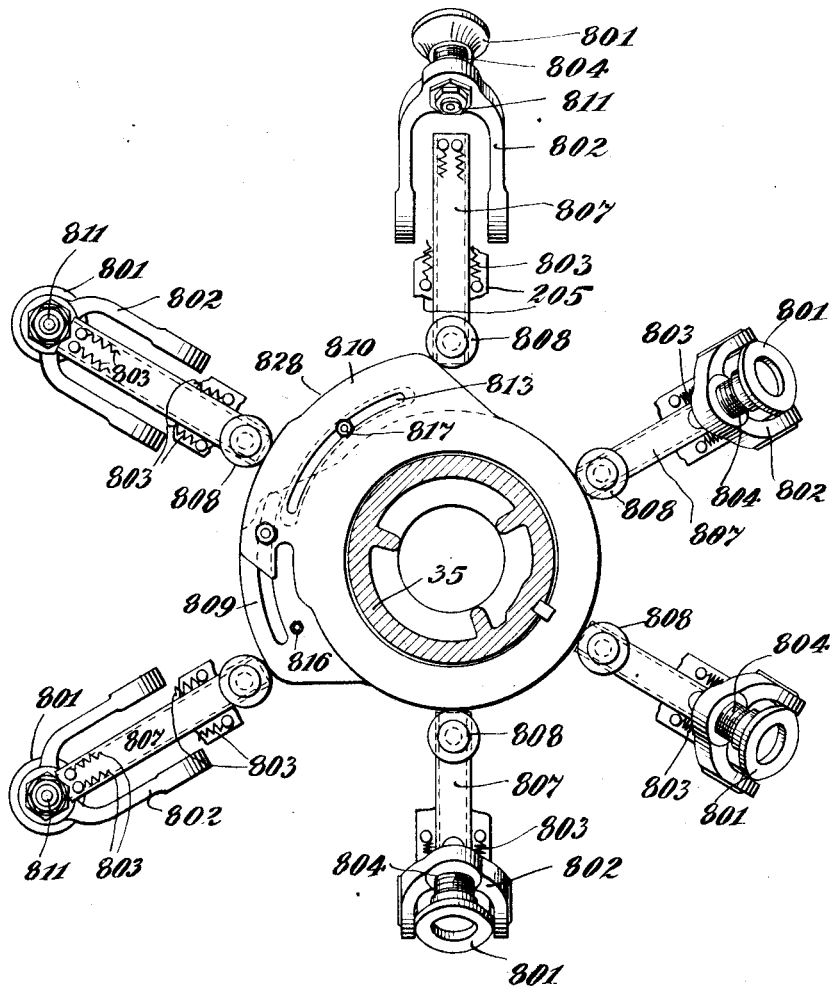
Inventor
Max Jaeger
By George Ramsey
his Attorney

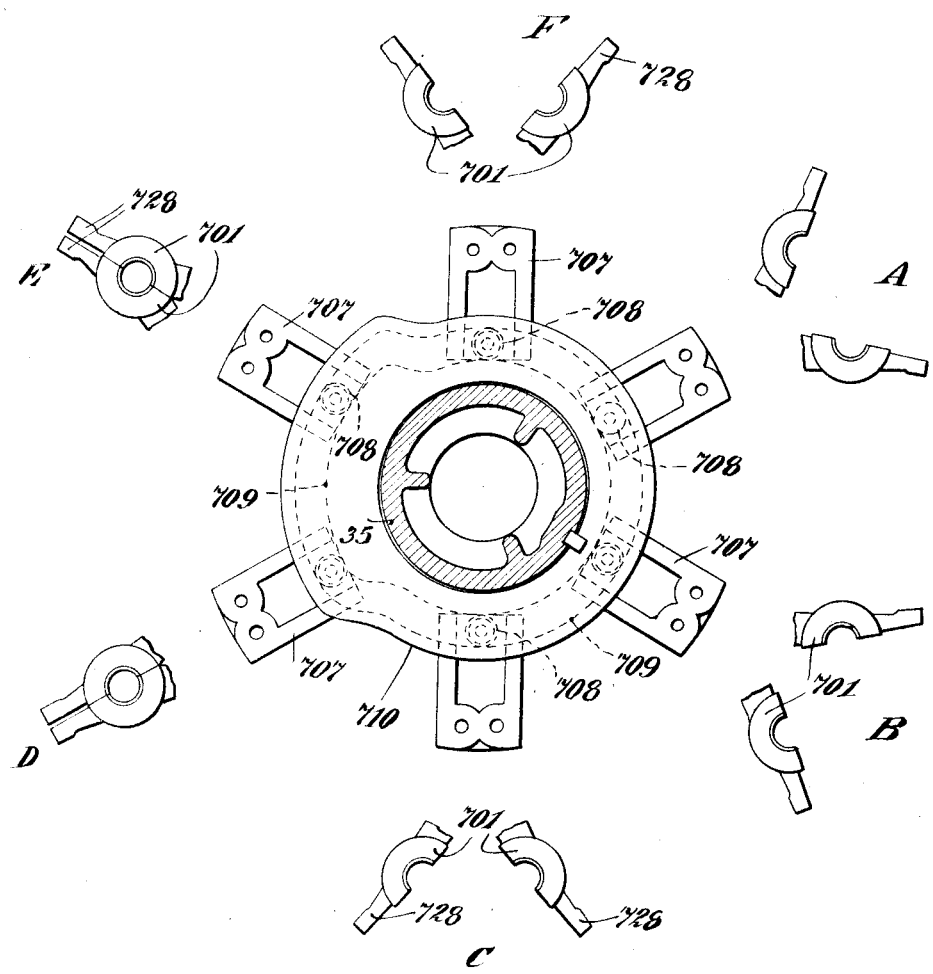

Dec. 4, 1928.  1,693,843
M. JAEGER
GLASS BLOWING MACHINE
Original Filed April 17, 1922 15 Sheets-Sheet 11

Inventor
Max Jaeger
By George Ramsey
his Attorney

Dec. 4, 1928. 1,693,843
M. JAEGER
GLASS BLOWING MACHINE
Original Filed April 17, 1922  15 Sheets-Sheet 12
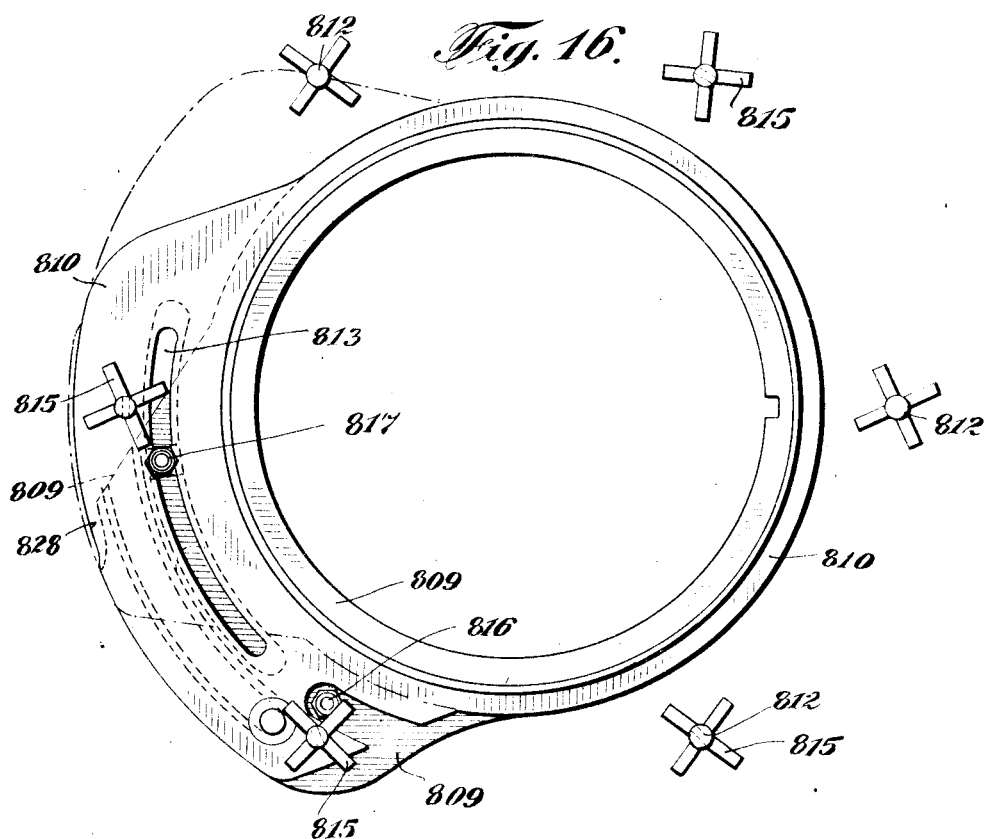
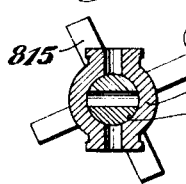
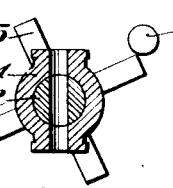
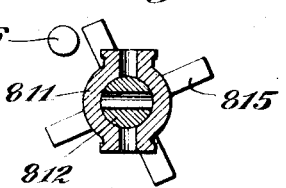

Dec. 4, 1928.
M. JAEGER
1,693,843
GLASS BLOWING MACHINE
Original Filed April 17, 1922   15 Sheets-Sheet 13
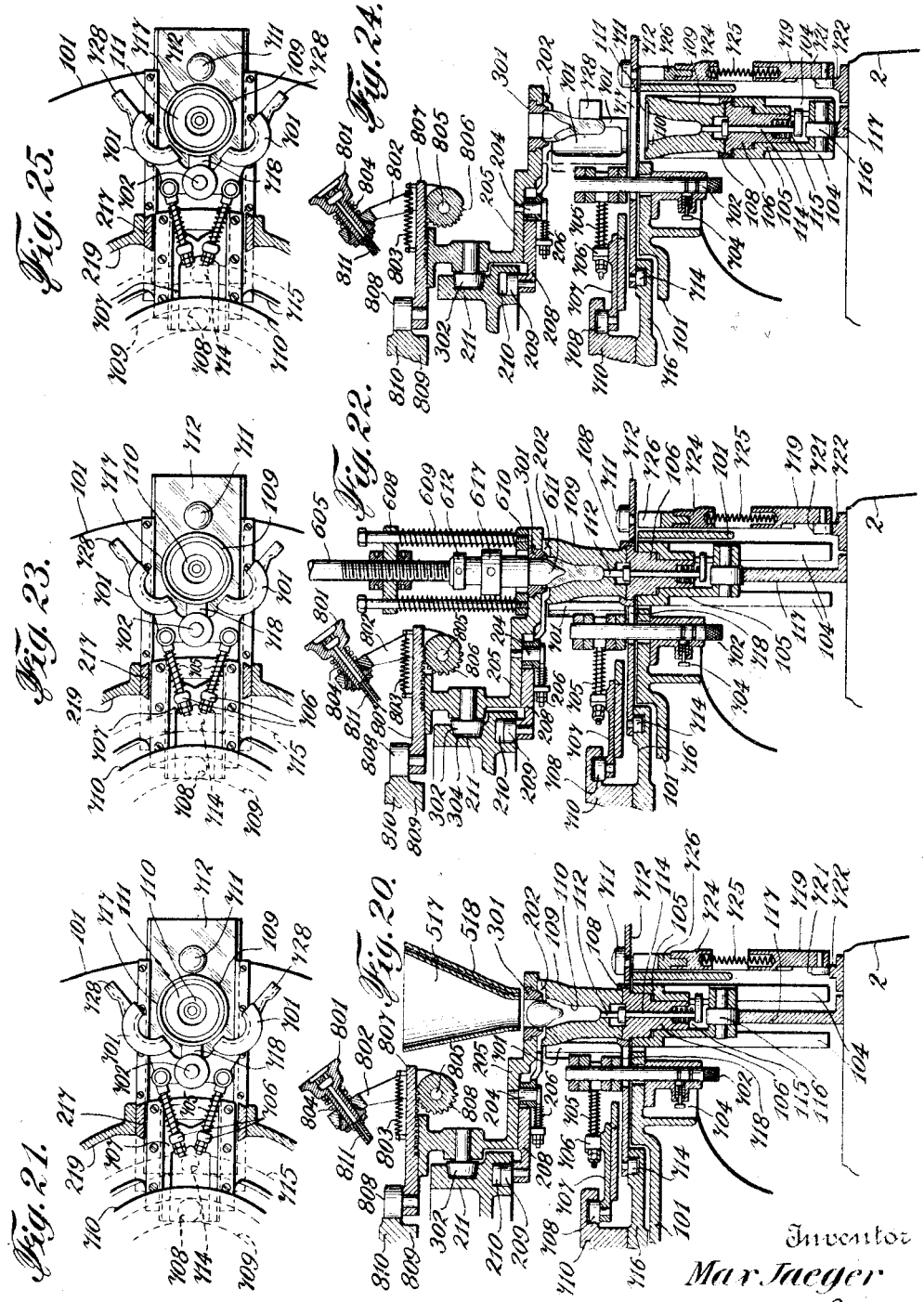
Inventor
Max Jaeger Dec. 4, 1928.
M. JAEGER.
GLASS BLOWING MACHINE
Original Filed April 17, 1922   15 Sheets-Sheet 14
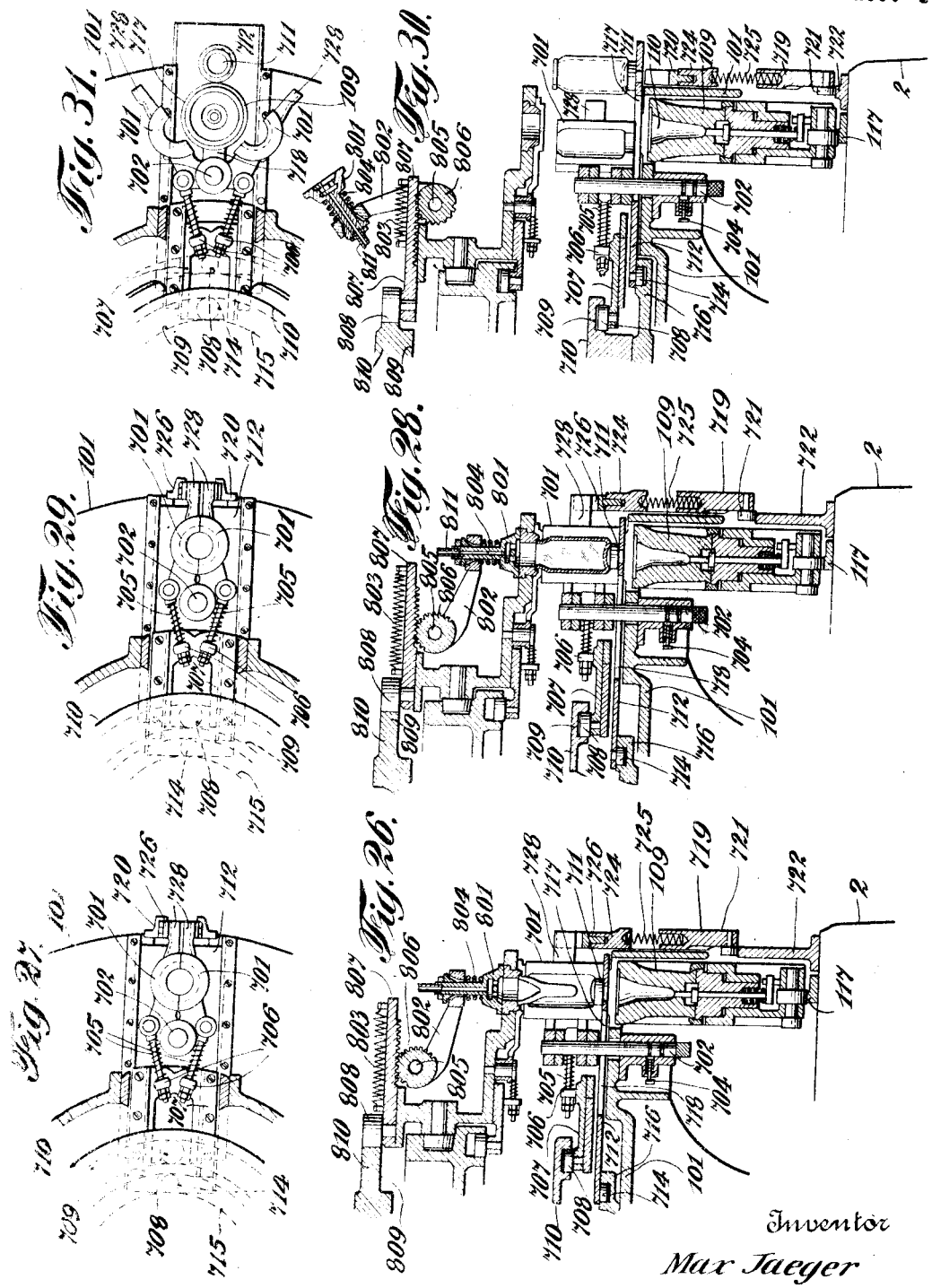
Inventor
Max Jaeger
By George Ramsey
his Attorney

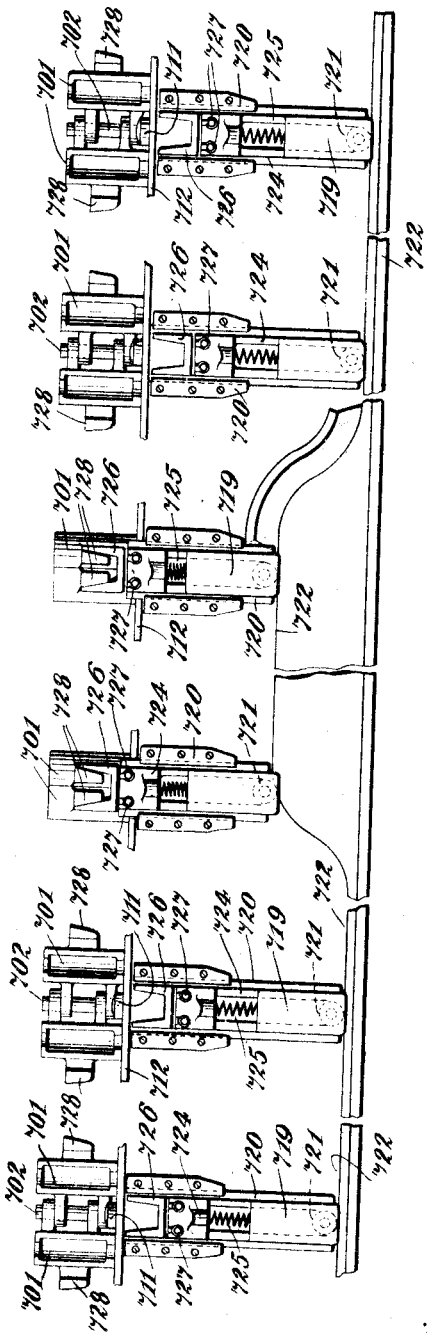

Patented Dec. 4, 1928.

1,693,843

UNITED STATES PATENT OFFICE.

MAX JAEGER, OF LONG ISLAND CITY, NEW YORK, ASSIGNOR TO ANCHOR CAP & CLOSURE CORPORATION, OF LONG ISLAND CITY, NEW YORK, A CORPORATION OF NEW YORK.

GLASS-BLOWING MACHINE.

Original application filed April 17, 1922, Serial No 553,900. Divided and this application filed August 6, 1924. Serial No. 730,389.

This invention is a division of my application Serial No. 553,900 filed April 17, 1922, relates to the glass art and more especially to an automatic blowing machine.

Heretofore in the art the most common type of presses has been of the stop and start type; that is, the mold table had an intermittent movement so that the whole mass of metal, comprising all the revolving parts of the machine, was stopped and started for each piece of ware manufactured. This motion imposed a very heavy duty upon the driving mechanism as well as on the press, because of necessity these very heavy parts had to be started, moved, and stopped at very small intervals of time when a machine was delivering many pieces of finished glassware per minute. This stopping and starting rendered the load condition on the driving forces very unsatisfactory because at one time there was no load,—as when the press is stationary,—and at the next instant the load was exceedingly heavy. If several machines were operating in unison this load disturbance was pyramided. Since several machines other than presses were usually run from the same driving plant this variable load factor disturbed the operation of other machines, unless the operating power was so powerful as to be inefficient and wasteful in operation. The jerky motion also jerked the glass charges around in the mold and under certain conditions introduced defects in the ware. Furthermore, such a type of machine naturally required constant repairs because of loosening of parts and breakage.

It has also been the practice in the art to provide complicated mechanisms for transferring the charge from the press mold to the blow mold. In many cases this was done by an inversion method where the charge was inverted either in one step or the other. This was liable to change the shape and condition of the glass and produce defects in the ware. Various types of split press molds have been in use but these molds leave seams in the finished ware where the split press mold parts meet. This is due to the very sensitive character of the glass when it leaves the feeder and before a thick skin is formed on the charge. Furthermore, complex transferring mechanisms increase the weight of moving parts and slow up the machine.

Where automatic feeders have been used it has been the practice to drive the feeder independently of the press. This has made it necessary to coordinate two separately driven machines to secure a common timing for the interval when the glass is delivered from the feeder to the press. There are times when it is necessary to change the rate of the feeder and there are times when it is desirable to change the rate of the press. These changes may be desirable simultaneously, or, either the press or the feeder may require the change. However, in any case where a change is made in either the feeder or the press as to the rate of charges delivered or the rate of finished ware produced, a corresponding change must be made in the other machine. Where the two machines have independent drives any change requires double manipulation and adjustments which must properly time the feeder and press at the new rate before ware can be made.

The machine embodying the invention hereinafter specified comprises a continuously rotating mold table having a constant speed of rotation, except when the speed is changed for adjustments, and wherein the feeding, pressing, blowing, and delivering operations are all performed without in any way changing the speed of rotation of the machine. Under these conditions the load is very even and the machine operates with minimum shock and jars. The power consumed is very light and since no abnormal load is produced a constant and efficient drive is the result.

The charge transferring devices are simple and are so located that the charge is not disturbed or marred during or after pressing. The parts are compact and therefore the machine occupies small floor space.

The machine embodying the present invention may be generally described as comprising a base frame upon which all the mechanisms except the feeder are mounted. This base frame carries a central column which is a mast around which the machine is built. The mold table revolves around this column and carries press molds and blow molds. The press molds rise through the mold table between the members of the split blow-molds and receive the glass charge which is dropped from the feeder into a funnel that at the feeding moment is moving clockwise with the mold. When the mold is fed the funnel leaves the mold and moves counterclockwise to a point slightly beyond the path of the falling charges, where the funnel is positioned over the next mold in the series and the cycle of feeding is repeated when the mold comes under the feeder. A pressing plunger which travels with the funnel is positioned over the mold previously charged when the funnel is positioned over the succeeding mold. Suitable ring molds are brought into cooperation with the press mold before the plunger descends. During the pressing operation the plunger and funnel both travel with their respective molds. In the machine there are a plurality of groups of mold members carried by the mold table and but one funnel and one plunger to serve these molds. The mold table, therefore, continuously rotates while the funnel and plunger oscillates. When the pressing operation is completed the neck of the ware is formed to overhang a split ring mold and then the plunger rises and the solid block pressing mold descends, leaving the charge suspended from the neck ring mold. After the descent of the pressing mold a slide brings the bottom of the blow mold into place beneath the charge and a blow mold then closes around the charge. A blow head descends upon the ring mold and air is admitted to the blow head, thereby blowing the charge into a finished article. The blow head then rises slightly and continues to blow cool air into the blown article, thereby gently cooling the hot glass. The blow mold now opens, the bottom slide moves out and carries outwardly the finished piece of ware. An automatic take-off comprising a pair of spring operated jaws then grasps the ware and removes the ware from the slide by a circular and, at the same time, lifting motion so that the ware is elevated slightly as it is removed from the bottom of the blow mold. At the next station the press mold rises and the cycle is repeated. In the machine herein disclosed there are six mold stations on the mold table and six cycles performed during one complete rotation of the mold table.

Realizing that the present invention may be embodied in constructions and devices other than those herein described and shown it is desired that the disclosure shall be considered as illustrative and not in the limiting sense.

Referring now to the drawings forming a part of this specification, like characters will be used through the veral figures to represent like parts.

Figure 1 is a perspective view of the machine;

Figure 2 is an elevational section view;

Figure 3 is a plan view of the driving shafts;

Figure 4 is a detail view of the clutch mechanism;

Figure 5 is a detail view of the drive to the vertical main shaft;

Figure 6 is a detail view of the mechanism for withdrawing the press from position beneath the feeder;

Figure 7 is a sectional view taken above the blow heads and shows the positions thereof;

Figure 8 is a sectional view taken above the blow molds and illustrates the position of these molds;

Figure 9 is a plan view of a single mold showing the ring mold closed and the blow mold open;

Figure 10 is a detail showing the wind chest and the blowing operation;

Figure 11 is a detail of the wind chest packing rings;

Figure 12 is a sectional view through line 12—12 on Figure 10;

Figure 13 is a diagrammatic view of the operation of the blow heads and cam therefor;

Figure 14 is a diagrammatic view of the blow mold and cam therefor;

Figure 16 is a diagrammatic view of the star wheels for operating the blow valves and the operating pins therefor;

Figures 17, 18 and 19 show the blow valves and operating pins in several different operative positions;

Figure 15:
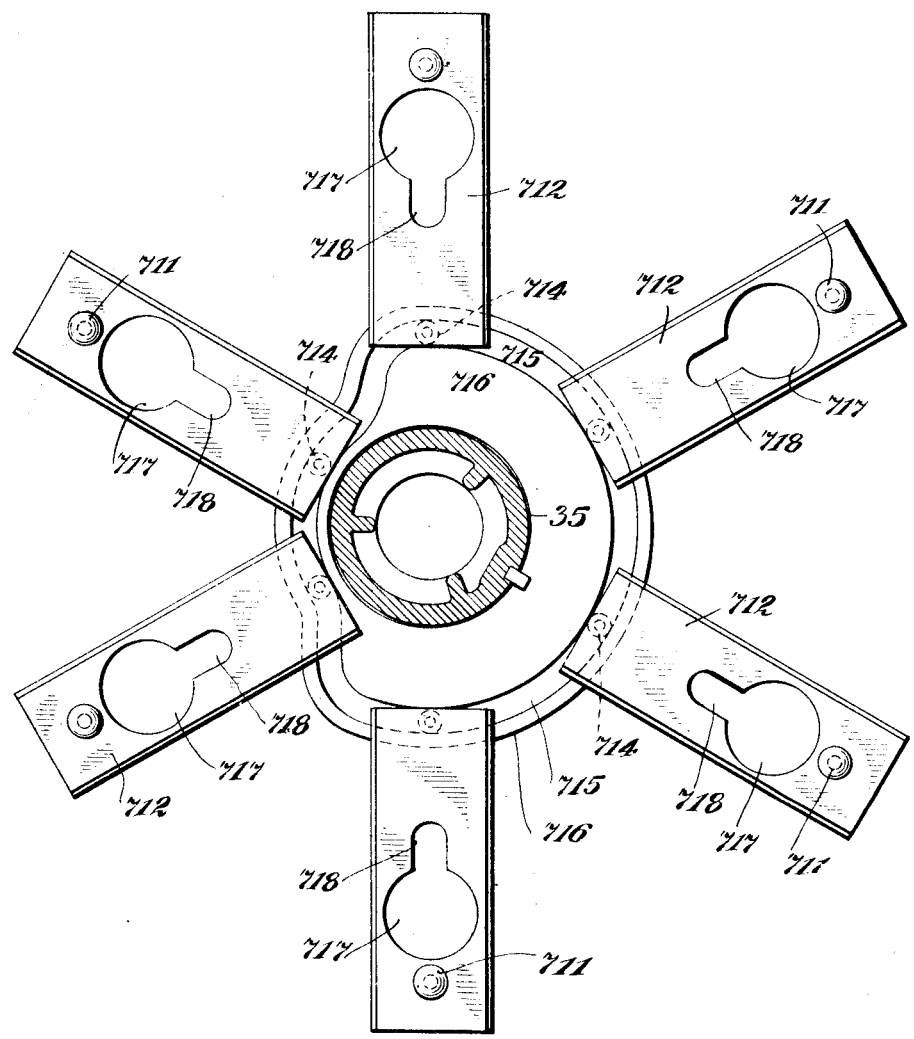
Figure 15 is a diagrammatic view of the slide plate and cam therefor.

Figures 20 to 31 inclusive are alternate plan and corresponding elevational views of a complete cycle of a single mold from receiving the charge to discharging the completed ware; and Figure 32 is a view showing a complete cycle of movement of the blow mold lock.

Reference will now be made to specific constructions embodying the invention which will be described in detail.

*Main drive and main frame.*

In view of the fact that it is desirable to be able to regulate the speed of operation of the machine, it is necessary that a variable speed drive be provided and this is accomplished by means of a variable speed motor 1 which is mounted on the main frame 2 and is connected by shafts 4 and 5 together with suitable connecting gearing 6 with a control wheel 7 so that the field of the motor may be controlled in such manner as to obtain a relatively large range of speed. The particular speed for which the motor is set to run is indicated on the dial 8 which faces the control handle wheel so that an operator manipulating the wheel may observe the needle on the dial to determine the speed at which the motor is being set to run.

The motor shaft carries a pinion 9 which meshes with a gear 10 that is mounted on the stub shaft 11. A gear 12 on the stub shaft 11 is in engagement with a gear 13 on a front section of the main shaft. The stub shaft 11 also carries bevel gear 14 which meshes with the bevel pinion 15 on the hand driven shaft 16 which permits the operator to place a crank on the squared portion 17 and thereby turn the machine by hand when desired. The hand driven mechanism runs idly when the machine is driven by the motor. The front section of the main shaft carries one half of a disk clutch member 18 and the main drive shaft 19 carries the other half of the disk clutch. This disk clutch is adapted to be operated by the lever 20 which is operated by pinion 21 and 22 on the control shaft 24 which carries the main control hand lever 25 so that when this lever is operated the disk clutch may be opened or closed to connect or disconnect the main shaft 19 from the motor drive. The main shaft carries a bevel pinion 26 which connects with a corresponding pinion 27 on the shaft 28 that carries a worm 29 which drives the worm wheel 30 that operates the take-off mechanism which will be described later.

The main drive shaft 19 also carries a large worm 31 which engages the main drive worm wheel 32 that is mounted on the vertical main shaft 34. Referring to Figures 2 and 5 it will be noted that the vertical main shaft extends upwardly through the column 35 which is fixedly mounted upon the main frame 2. The vertical main shaft 34 carries a reduction gear 36 that meshes with a larger gear 37 on the vertical countershaft 38 which also carries on its upper end a pinion 39 that engages a mold table drive gear 40 so that the mold table is continuously rotated when the main shaft 19 is driven.

Referring now to Figures 3 and 4, it will be noted that the front main shaft which rotates whenever the motor is running, carries a gear 41 which engages a gear 42 on the glass feeder shaft 44. This gear 42 carries one part of a simple spiral clutch 45. The main drive shaft 19 runs at a relatively high speed as compared to the speed necessary to operate the timer for the glass feeder to enable the feed to deliver glass at the proper rate for the press. When the press is stopped and withdrawn from the feed, as will later be explained, it is desirable to run the feed at a higher rate so that small charges will be dropped in a suitable cullet trough. When the press is operating, however, and the drive for the press is driving the feeder, it is desirable to take the power for the feeder from a high speed main shaft, thus avoiding irregularities in speed which might be due to press operation, and a reduction gearing is introduced as a means for obtaining the proper speed for the feeder control drive. This is accomplished (Figures 3 and 4) by the gear 46 on the main drive shaft 19 which meshes with a gear 47 on the slidable frame 48, that slides upon the base 49 when the clutch lever 20 is actuated because this clutch lever 20 is connected to the frame 48 by a lever 50 of the second class which is pivoted at 51 to the base 49. The gear 47 is connected to a revolving head 52 mounted to revolve on the shaft 44. This head carries planetary gears 54, the larger of which meshes with the stationary annular gear 55 and the smaller of which meshes with the annular gear 56 that is attached to the outside annular gear 57. A pinion 58 is carried by the short shaft 59 mounted in the frame 48, which shaft carries another pinion 60 on its outer end. This pinion 60 meshes with the small pinion of the double reduction gear 61 that is also mounted upon the frame 48. The larger member of the double reduction gear 61 meshes with a pinion 62 secured to the shaft 44. By this construction it will be noted that when the clutch lever 20 is operated to open the disk clutch the positive clutch 44'—45' drives the feeder shaft 44 and the frame 48 has been moved forward to disengage the gear 46 from meshing with the gear 47. However, when the clutch lever 20 is operated to close the disk clutch then the positive clutch 44'—45' is opened and the gears 46 and 47 are in mesh. Power from the main shaft 19 is transmitted to the gear 46 and from it to the gear 47, which drives the revolving head 52 and causes the planetary gears to travel around the stationary annular gear 55. This motion causes the planetary gear to transmit a slow speed to the annular gear 56 dependent upon the ratio of teeth in these several gears. Power is then transmitted from the annular gear 57 through the gears 58, 59, 60 and 61 to the pinion 62 on the feeder shaft 44. This feeder shaft is formed in several sections connected together with pairs of bevel gears and finally is connected by a universal coupling 64 with a shaft 65 that extends parallel to the track of the machine. This shaft 65 has a sliding key drive engagement with the sprocket wheel 66 that is secured to the stationary post 67. The sprocket carries a silent chain 68 which drives the feeder control 69. This chain drive, operated by the sliding shaft, permits the machine to be withdrawn from beneath the feeder without breaking the drive to the feeder.

The main frame 2 rests upon track wheels 70 which are adapted to roll upon rails 71 so that the machine may be moved toward or from the feeder, as is necessary or desired. It will also be noted that the switch-board 72 adjacent the motor is connected to the control switch 74 for the motor by suitable conduit 75.

*Blow mold.*

After the glass charge has been pressed in the press mold to form the neck of the ware the press mold descends, as has been described more fully in application Serial No. 553,900, and the blow mold comes into operation. The mechanism for operating the blow mold is shown more especially in Figures 1, 2, 8, 14, 15 and 32. The blow mold illustrated is a split mold formed of members 701 that are pivotally mounted upon removable pins 702 that are held in place in sockets in the mold table by lock pins 704. These blow mold members 701 are connected on the outside portions with the adjustable spring links 705 which are slidable through posts 706 on the slide plate 707. This slide plate carries a roller 708 that travels in the groove 709 in the stationary cam 710 when the mold table rotates around the column 35. The operation of this slide causes the links 705 to positively open the mold and permits the springs on the links to yieldingly close the mold. The bottom of the blow mold 701 comprises a base or button 711 carried upon a slide 712 that is mounted upon the mold table 101. The slide carries on its inner end an actuating roller 714 that travels in the groove 715 in the stationary cam 716 when the mold table revolves. This slide, (Fig. 15) is provided with an opening 717 through which the press mold 109 rises when the slide 712 is in outer position, which is the position of this member in all but two stations in the operation of the machine. This slide 712 is also provided with a slot 718 which provides clearance for the pin 702 that forms the pivot for the blow mold sections.

In order to hold the blow mold securely locked a cam operated lock is provided on the outer portion of the mold table. This lock is illustrated more specially in Figures 2 and 32. It comprises a base portion 719 which slides in guides 720 and carries a roller 721 that travels upon the circular cam 722 that is concentric with the block mold track 117. The base member 719 is telescopically connected with a carrier 724 that is maintained in extended position by a coiled spring 725. This carrier carries a locking head 726 that is mounted upon roller bearings 727 to provide lateral movement during the locking operation. Each mold member 701 is provided with an extension 728 that is provided with a downwardly inclined face so that when the locking head 726 is raised it wedges these members together and tightly locks the mold members in closed relation.

Blowing mechanism.

When the blow mold 701 is closed the blowing operation commences and the devices for this operation are illustrated more particularly in Figures 2, 7, 10, 11, 12, 26 and 27. The blow head 801 is adapted to fit tightly against the upper surface of the solid ring mold and is carried upon a pair of swinging arms 802 which are pivoted to rotate on the ring mold frame. The blow head carries a spring 804 that is compressed when the arms 802 descend after the blow head contacts with the ring mold. The shaft 805 upon which the arms 802 are mounted carries a gear 806 which meshes with the slidable rack 807 that is also mounted upon the ring mold frame. This rack carries a roller 808 which the spring 803 holds against the stationary cam 809 that is mounted upon the column 35. The cam 809 is provided with an adjustable part 810 which permits the time of operation of this cam to be shortened or lengthened at will. As the mold table revolves the blow heads are raised and lowered by the operation of the sliding rack 807.

Each blow head 801 is connected by a flexible pipe with a control valve 811. This control valve 811 (Figs. 10 to 12 and 16 to 19) comprises a rotating body 812 in the casing 811, which body is provided with a single opening and is connected with an operating shaft 814 that is journaled in the spider that is bolted to the mold table. Each shaft 814 is provided with a star wheel 815 that is actuated by the pins 816 and 817. The pin 816 is carried by the cam 809 and the pin 817 is adjustably mounted in the slot 818 in the cam 810. When the star wheel 815 contacts with the pin 816 the air valve is opened as shown in Figure 18 and as the star wheel passes the pin 817 the air is cut off from the blow head by closing of the valve as is shown in Figure 19, it being understood that the valve is moving in the direction of the arrows in Figures 17, 18 and 19.

A wind chest 818 is provided between the sleeve 819 of the lock ring and the wall of the column 35. This wind chest is provided with wedge shaped packing rings 820 and 821 which are supported upon backing members 822 and 824 that are separated by spring 823. This wind chest is supplied with compressed air from the main supply line which connects with the conduit 826 in the column 35. This connection is made through an opening 827 in the sleeve 512 of the swinging frame 511.

By referring to Figures 13 and 16 it will be noted that the cam 810 has a portion 828 that permits the blow head to slightly rise before the blowing air is cut off. This permits the air in the blown ware to escape under the blow head and also allows a blast of cold air to be blown into the ware in the mold to cool the ware.

A detailed description of the block mold, split ring mold, solid ring mold, feeder and draw back mechanism, pressing mechanism and the take-off mechanism as set forth in the parent application Serial No. 553,900 is believed to be unnecessary in this divisional application as none of the claims herein are directed to those features.

From the foregoing description and drawings it will appear that the present machine is relatively simple in construction and operation and is exceedingly flexible as to adjustments during operation and as to changes necessary to make different types of ware. The controls are all centered at one station where the operator may control the whole operation of the machine without moving from the station, and the continuity of operations renders the control adjustments easy to make.

Having thus described my invention, what I claim is:

1. The combination in a glass machine of a continuously revolving mold table, a plurality of split molds for said table, a blow head for each mold, a solid ring and a split ring, and means for applying said blow heads to said blow molds and for lowering said solid ring toward said split molds and closing said split ring, said means being automatically operative as the table revolves.

2. A machine according to claim 1 wherein stationary cams operate said means.

3. A machine according to claim 1 together with means for adapting said machine to articles of different sizes.

4. In a glass machine, a rotating mold table, a plurality of molds upon said mold table, a blow-head for each of said molds; a wind chest having a wall revolving with said mold table, said wind chest being packed and rendered capable of retaining compressed air by rings separated by backings supported by a coiled spring; and a conduit connecting each blow-head with said wind chest by way of said revolving wall.

5. In a machine of the class described, a wind chest comprising a pair of relatively movable walls, and a spring pressed gasket for minimizing leakage between said walls, the various elements of said spring pressed gasket being separate from said walls.

6. In a machine of the class described, a wind chest comprising a pair of relatively movable walls, a pair of gaskets to minimize leakage between said walls, and spring means between said gaskets to urge them into operative position relative to said walls, said spring pressed means being separate from said walls.

7. In a machine of the class described, a wind chest comprising a pair of relatively movable walls, a pair of gaskets for reducing leakage between said walls, a backing for each of said gaskets, and spring means urging said backings against their respective gaskets, said backing and spring means being separate from said walls.

8. In a machine of the class described, a wind chest comprising a pair of contiguous relatively movable walls shaped to form two oppositely positioned troughs at the junction of the walls, packing material in said troughs, and spring means between said troughs to urge said material therein.

9. In a glass machine, a mold, a pivoted arm, a blow-head carried by said arm, and a rack and pinion operatively associated with said arm to rotate the same and thereby move said blow-head with respect to said mold.

10. In a glass machine, a mold, a pivoted arm, a blow-head carried by said arm, a rack and pinion for rotating said arm to move said blow-head with respect to said mold, and a cam for actuating said rack.

11. In a glass machine, a mold, a blow-head having an operative and a non-operative position with respect to said mold, and spring means for biasing said blow-head in its non-operative position.

12. In a glass machine, a mold, a blow-head having an operative and a non-operative position with respect to said mold, spring means for biasing said blow-head in its non-operative position, and intermittently operated means to move said blow-head into its operative position.

13. In a glass machine, a mold, a blow-head having an operative and a non-operative position with respect to said mold, spring means adapted to bias said blow-head in its non-operative position, and a cam for moving the blow-head into its operative position.

14. In a glass machine, a rack, a spring biasing said rack in one position, a cam adapted to move said rack in opposition to said spring, a pinion engaged by said rack, an arm attached to said pinion, and a blow-head carried by said arm.

15. In a glass machine, a blow-head, spring means for moving said blow-head into a first position, and a cam for moving said blow-head into a second position, said cam being adjustable to vary the length of cam surface which maintains said blow-head in the second position.

16. In a glass machine, a rotating mold table, a plurality of molds upon said mold table, a blow-head for each of said molds, conduits for supplying air to said blow-heads, a valve controlling the flow of air through each of said conduits, star wheels adapted to manipulate said valves, a pair of pins for actuating said star wheels, and means to adjust the distance between said pins.

17. In a glass machine, a rotating mold table, a mold on said table; a blow-head for said mold; a conduit for supplying air to said blow-head; a valve controlling the flow of air through said conduit; a star wheel connected to said valve, said valve and star wheel moving bodily with said mold table; and a pin positioned to be struck by said star wheel due to movement of the star wheel bodily with the mold table, said pin being adapted to manipulate the star wheel and the valve connected thereto.

18. In a glass machine, a rotating mold table, a plurality of molds upon said mold table, a blow-head for each of said molds, conduits for supplying air to said blow-heads, valves controlling the flow of air through said conduits, star wheels associated with said valves, and a stationary pin adapted to be successively engaged by the star wheels to manipulate the valves successively.

19. In a glass machine, a rotating frame, a blow-head movably mounted upon said frame, a valve for controlling the flow of air to said blow-head, a star wheel for manipulating said valve, a stationary two-part cam for moving said blow-head, the parts of said cam being adjustable relative to each other to vary the dwell of the cam, and a star wheel actuating pin carried by each part of said cam.

20. In a glass machine, a mold, a blow-head associated with said mold, said blow-head being movable vertically and having a position in which it delivers air to the mold, means to deliver compressed air to said blow-head for an interval, and means to lift said blow-head with respect to said mold while compressed air is being delivered to said blow-head, whereby air is blown over the mold to cool the same.

21. In a glass machine, a mold, a blow-head, means to lower said blow-head into and to raise said blow head out of operative relationship with said mold, a compressed air supply, and means to connect said supply to said blow-head after the blow-head has been moved into operative relationship with said mold and to disconnect said supply after said operative relationship has been terminated.

22. A glass machine comprising a continuously rotating mold table, a plurality of split molds for said table, a blow-head for each of said molds, a solid ring mold and a split ring mold for each of said split molds, and means to move the solid ring molds vertically toward and away from said split molds.

23. A glass machine comprising a continuously rotating mold table, a plurality of split molds on said mold table, a blow-head for each of said molds, a solid ring mold movable with respect to said blow-head and a split ring mold for each of said molds, said blow-heads being operable to blow air through said solid ring molds, and a cam for moving said solid ring mold vertically.

24. A glass machine comprising a continuously rotating mold table, a plurality of split blow molds on said mold table, a blow-head for each of said molds, a solid ring mold movable with respect to said blow-head and operable to blow air through said solid ring molds, and a split ring mold for each of said molds, and a cam for moving portions of said split ring molds horizontally.

25. A glass machine comprising a continuously rotating mold table, a plurality of split blow molds on said mold table, a blow-head for each of said blow molds, a solid ring mold movable with respect to said blow-head, said blow-head being adapted to blow air through said solid ring mold and a split ring mold for each of said molds, and means adapting said machine to blow articles of different heights.

26. In a glass machine, a rotating mold table, a plurality of molds upon said mold table, a blow-head for each of said molds, conduits for supplying air to said blow-heads, valves controlling the flow of air through said conduits, and pin actuated star wheels for manipulating said valves.

27. A glass machine comprising a rotatable mold table, a plurality of split molds for said table permanently maintained in upright position, a blow head for each of said molds, a solid ring mold and a split ring mold for each of said split molds, and means to move the solid ring molds vertically.

28. A glass machine comprising a rotatable mold table, a plurality of split molds on said mold table, a blow head for each of said molds, a solid ring mold and a split ring mold for each of said molds, said solid ring mold having a depending cylindrical portion adapted to telescope about the upper end of the article about to be blown, and a cam for moving said solid ring molds vertically to and from said molds.

29. The combination in a glass machine of a rotatable mold table, a plurality of split blow molds for said table, a blow head for each blow mold, a solid ring having a depending portion adapted to telescope about the upper end of the article to be blown to form a smooth sealing zone thereon, a split ring, and means for applying said blow heads to said blow molds and for moving said solid ring with respect to said blow head and closing said split ring, said means being automatically operative as the table revolves.

30. A glass machine comprising a rotatable mold table, a split blow mold, a blow head for said split blow mold, a solid ring mold mounted independently of said blow-head and having a depending portion of substantial length adapted to telescope about the outer wall of the article to be formed and means for positioning said solid ring mold with respect to said split mold.

31. A glass machine comprising a rotatable mold table, a split blow mold, a blow head for said blow mold movable with respect to said solid ring mold, a solid ring mold having a depending portion of substantial length adapted to telescope about the outer wall of the article thereby to provide a smooth sealing zone at the upper end of the article, means for moving said solid ring mold independently of said blow-head toward and away from said split mold.

MAX JAEGER.